United States Patent [19]

Cusano et al.

[11] Patent Number: 4,873,708
[45] Date of Patent: Oct. 10, 1989

[54] DIGITAL RADIOGRAPHIC IMAGING SYSTEM AND METHOD THEREFOR

[75] Inventors: Dominic A. Cusano; George E. Possin, both of Schenectady, N.Y.

[73] Assignee: General Electric Company, Milwaukee, Wis.

[21] Appl. No.: 48,236

[22] Filed: May 11, 1987

[51] Int. Cl.$^4$ ............................................. G01N 23/04
[52] U.S. Cl. ...................................... 378/62; 378/19; 250/370.09; 250/327.2
[58] Field of Search ..................... 378/62, 19, 10, 11; 250/369, 361 R, 370.09, 370.11, 327.2

[56] References Cited

U.S. PATENT DOCUMENTS

| | | | |
|---|---|---|---|
| 4,099,060 | 7/1978 | Franke | 378/11 |
| 4,288,264 | 9/1987 | Haque | 378/19 |
| 4,338,521 | 9/1981 | Shaw et al. | 250/370.11 |
| 4,383,327 | 5/1983 | Kruger | 378/19 |
| 4,472,728 | 9/1984 | Grant et al. | 250/367 |
| 4,473,513 | 9/1984 | Cusano et al. | 264/1.2 |
| 4,525,628 | 6/1985 | DiBianca et al. | 250/367 |
| 4,672,207 | 6/1987 | Derenzo | 250/369 |
| 4,709,382 | 11/1987 | Sones | 378/62 |

OTHER PUBLICATIONS

Oldelft Publication Entitled "X-ray Image Sensor Based on an Optical TDI-CCD Imager".

Primary Examiner—Carolyn E. Fields
Assistant Examiner—David P. Porta
Attorney, Agent, or Firm—John F. McDevitt

[57] ABSTRACT

A digital radiographic imaging system which employs co-operative means for converting the x-rays to an optical image having enhanced quality and detecting said optical image. The x-ray conversion medium employed in the improved radiographic system is positioned physically contiguous to a bi-directional array of electrical charge transfer devices which convert the optical image to an electronic analog representation thereof. Digital information processing means are further included in the improved radiographic system to convert the electronic analog representation of the optical image to a recorded digital representation thereof. The x-ray conversion medium being employed in the improved radiographic system is a high efficiency scintillator body which moves co-operatively with the photo detection means being employed in a further synchronous relationship with a moving fan beam of X radiation being employed to generate the desired optical image after passage through a stationary object.

29 Claims, 1 Drawing Sheet

DIGITAL RADIOGRAPHIC IMAGING SYSTEM AND METHOD THEREFOR

RELATED PATENT APPLICATIONS

A co-pending application Ser. No. 07/046,443, filed May 6, 1987 now abandoned, assigned to the same assignee as the present invention, discloses a high efficiency type x-ray image converter member which can be employed in practicing the present invention. Specifically, said converter medium comprises a scintillator body having a layer configuration and made up of x-ray stimulable phosphor particles suspended in a substantially void-free matrix of a particular solid organic polymer. The phosphor and polymer constituents in said composite medium have substantially the same optical refractive index characteristics so as to be substantially transparent to the optical radiation being emitted by said phosphor constituent when retrieving a latent radiographic image previously stored in said medium. In still another co-pending application Ser. No. 07/046,442, filed May 6, 1987, now abandoned also assigned to the present assignee, there is disclosed a like type scintillator body wherein the phosphor composition has been modified to reduce its optical refractive index and thereby provide a closer match to the optical refractive index characteristics of various solid organic polymers. More particularly, said further improved scintillator body contains a europium activated barium fluorohalide phosphor material modified to further include a sufficient level of an impurity ion selected from Group 1A and 3A elements in the periodic table of elements to reduce the optical refractive index of said modified phosphor.

BACKGROUND OF THE INVENTION

This invention relates generally to an improved digital radiographic imaging and recording system which is especially useful in medical radiographic applications and more particularly to a system of said type wherein a moving fan beam of X radiation is employed in combination with photodetection means to digitize and record the optical image formed immediately responsive to X radiation.

As previously indicated, scintillator materials emit visible or near visible radiation when stimulated by x-rays or other high energy electromagnetic photons hence are widely employed in various industrial or medical radiographic equipment. In medical applications it is desirable that the scintillator output be as large as possible to minimize exposure of the medical patient to the x-ray dosage. A known class of scintillator materials considered for use in computerized tomography applications is monocrystalline inorganic compounds such as cesium iodide (CsI), bismuth germanate ($Bi_4Ge_3O_2$), cadium tungstate ($CdWO_4$), calcium tungstate ($CaWO_4$) and sodium iodide (NaI). Another known class of scintillator materials comprises polycrystalline inorganic phosphors including europium activated barium fluorochloride (BaFCl:Eu), terbium activated lanthanum oxybromide (LaOBr:Tb), and thulium activated lanthanum oxybromide (LaOBr:Tm). A still third class of already known scintillator materials found useful in computerized tomography comprises various dense sintered polycrystalline ceramics such as rare earth doped yttria/gadolinia ($Y_2O_3/Gd_2O_3$) and polycrystalline forms of said previously mentioned phosphors including BaFCl:Eu, LaOBr:Tb, CsI:Tl, $CaWO_4$, and $CdWO_4$.

In U.S. Pat. No. 4,383,327, there is disclosed a scanning slit electronic radiographic system employing a linear array of electronic radiation detectors to digitize and record the optical image formed in an image intensifier device when stimulated by X radiation after passage through a medical patient. It is recognized in said prior art disclosure that an image intensifier device is subject to various problems of scattered radiation producing distortion and loss of information details in the optical image being formed. It is still further recognized in said prior art disclosure that such radiation scattering in the image intensifier device requires an increased exposure of the patient to radiation in order to prevent such degradation of the image quality and which is an undesirable consequence for medical radiographic applications. The emerging optical image from said image intensifier device in said prior art radiographic system is optically focused upon remotely located charge coupled devices forming the photodetection means in said system thereby occasioning additional detection efficiency losses in the optical information being retrieved such as resolution and contrast losses. The physical orientation of charge coupled devices forming the photodetection means in said prior are radiographic system consists of parallel aligned columns and rows in a spaced apart configuration. Such a spaced apart configuration creates void spaces whereby still further optical information can be lost for an inaccurate representation of the optical information being retrieved.

A staggered physical orientation for said photodetection means is disclosed for a digital radiographic system of the same type in a publication entitled "X-ray Image Sensor Based on an Optical TDI-CCD Imager" authored by J. deGroot, J. Holleman, and H. Wallinga and issued by Oldelft Optical Industries. Said improved photodetection means is reported to be physically coupled to the exit window of an image intensifier device to provide a more unbroken and thereby more accurate representation of the optical information being retrieved. By further reason of the relatively complex and fragile nature of the image intensifier device being employed in both prior art radiographic imaging systems, however, said devices are seen to remain stationery while being operated with the patient being moved during exposure to the x-ray fan beam such as positioned on a movable table aligned therewith. Understandably, any involuntary movement of the medical patient in either prior art radiographic imaging process creates still another source of error, such as blurring, in the optical image being formed.

It remains desirable, therefore, to provide an improved digital radiographic imaging system of this general type which is not subject to the inherent limitations experienced when using an image intensifier device.

It is another important object of the invention to provide a more compact and rugged as well as simplified equipment system and method for digitally recording a radiographic image as formed and in a manner providing improved quantum detection efficiency.

Still another important object of the present invention is to provide such an improved digital radiographic imaging system that is relatively inexpensive as well as more reliable to construct and operate while further not experiencing loss in the principal benefits now achieved with a radiographic technique of this type.

SUMMARY OF THE INVENTION

Novel composite x-ray conversion and photodetection means have now been discovered for a digital radiographic imaging and recording system which provides enhanced quality for the optical image being formed responsive thereto. More particularly, said improved composite medium comprises a movable scintilator body having a dense, self-supporting and substantially void-free layer configuration which is substantially transparent to the optical radiation emitted from said medium and which is positioned physically contiguous to a photodetector member moving synchronously therewith so that both scintillator body and photodetection means are exposed to a moving x-ray fan beam in the same linear travel direction for conversion of said moving x-ray fan beam to an optical image for simultaneous detection of said optical image in a point-by-point and line-by-line manner. Said moving x-ray fan beam is generated in the present digital radiographic imaging system with an x-ray source having a movable scanning bar member combined therewith which includes a slit opening and moves in a linear travel direction. The movable photodetection member in the present digital radiographic imaging system comprises a plurality of bi-directional charge transfer devices arranged in electrically interconnected columns and rows, said columns being aligned in the same linear travel direction as the moving x-ray fan beam while said rows being aligned substantially transverse thereto in order to also synchronously shift the signals being generated by optical radiation impinging upon an individual charge transfer device located in the same column in the opposite direction to the travel direction of said moving photodetection member and with said signal shifting being carried out by a time delay and integration mode of operation to form an electrical analog representation of said optical image. Accordingly, the presently improved digital radiographic imaging system basically comprises said movable scintillator body having a dense self-supporting and substantially void-free layer configuration which is substantially transparent to the optical radiation emitted from said medium, an x-ray source to expose said scintillator body to an x-ray fan beam moving in a linear travel direction and after passage through an object, a photodetector member positoned physically contiguous with said movable scintillator body and movable therewith so that both scintillator and photodetector member move synchronously with the moving x-ray fan beam in the same linear travel direction for conversion of said moving x-ray fan beam to an optical image for simultaneous detection of said optical image in a point-by-point and line-by-line manner, said movable photodetector member having a plurality of bi-directional charge transfer devices arranged in electrically connected columns and rows, said columns being aligned in the same linear travel direction as the moving x-ray fan beam while said rows being aligned substantially transverse thereto in order to also synchronously shift the signals being generated by optical radiation impinging on an individual charge transfer device located in the same column in the opposite direction to the travel direction of said moving photodection member and with said signal shifting being carried out by a time delay and integration mode of operation to form an electrical analog representation of said optical image, and immediately converting said electrical analog representation of said optical image to a recorded digital representation thereof by digital processing means. In said presently improved digital radiographic imaging and recording system said time delay and integration mode of operation for said moving photodetector member is achieved with a spatial orientation of the individual charge transfer devices such that the individual charge transfer devices forming a row are aligned in an offset but overlapping positional relationship with respect to the next adjoining row of individual charge transfer devices and with the preferred embodiments maintaining a like spatial relationship between all alternate rows of individual charge transfer devices in said photodetector member to form a parallel alignment for the column orientation of said charge transfer device in said photodetector member. The preferred charge transfer devices are charge coupled devices exhibiting the operational characteristics hereinafter described but with already known charge injection devices also being contemplated as capable of performing in a like manner. As also to be described more fully hereinafter in connection with the preferred embodiments for practicing the invention, the synchronized signal shifting between adjoining charge transfer devices proceeds such that signals are shifted from a device at the same velocity as the scan movement albeit in the opposite direction.

General operation of the above defined present radiographic imaging and recording system comprises forming an optical image by scanning an object with a moving scintillator body in a linear travel direction during exposure of said object to a moving x-ray fan beam to form said optical image as a point-by-point and line-by-line composite of the object area being scanned, said scintillator body having a dense, self-supporting and substantially void-free layer configuration which is substantially transparent to the optical radiation being emitted from said medium, simultaneously transmitting said optical image when formed to a moving photodetector member aligned with said moving x-ray fan beam and moving synchronously in the same linear travel direction as said moving x-ray fan beam, said moving photodetector member being positioned physically contiguous with said moving scintillator body and movable therewith so that both scintillator body and photodetector member move synchronously with the moving x-ray fan beam in the same linear travel direction for conversion of said moving x-ray fan beam to an optical image for simultaneous detection of said optical image as an electrical analog representation thereof and without experiencing substantial optical attenuation, said moving photodetector member also having a plurality of bi-directional charge transfer devices arranged in electrically connected columns and rows, said columns being aligned in the same linear travel direction as the moving x-ray fan beam while said rows being aligned substantially transverse thereto in order to also synchronously shift the signals being generated by optical radiation impinging on an individual charge transfer device located in the same column in the opposite direction to the travel direction of said moving photodetector member and with said signal shifting being carried out by a time delay and integration mode of operation, and immediately converting said electrical analog representation of said optical image to a recorded digital representation thereof by digital processing means. In the preferred operating embodiments, digital computer means are employed for recording the optical image as formed by the composite x-ray image converter and detection means and which can further include electronic signal processing circuitry to further enhance the quality of the finally recorded radiographic image by various already known information processing techniques. Accordingly, the electronic analog signals generated by said photodetection means employed in said preferred radiographic imaging process are transmitted to said digital image processing means which can still further include contemporaneous visual display operatively associated with the digital image processing means such as a vidicon camera or cathode ray tube. As can be noted from the elimination of any requirement for an image intensifier device in carrying out the above defined digital radiographic imaging and recording process, there is achieved a higher quantum detection efficiency, resolution and contrast in the retrieved optical image together with an unbroken pixel array for the radiographic information being retrieved.

To provide enhanced quality for the optical image formed in accordance with the present invention, it is required that the scintillator body material absorb most of the X radiation being employed so that radiographic information details do not escape as well as have a substantially void-free solid medium so as not to produce excessive scattering and loss of the converted optical radiation. Said desired x-ray conversion behavior is achieved in the presently useful scintillator materials with a high absorption value at a material density of at least 99% or greater to provide superior resolution capability for the optical image generated in accordance with the present invention.

As previously indicated, a relatively broad class of solid state scintillator materials has been found useful as the conversion medium in digital radiographic imaging and recording system. A preferred general class of polycrystalline ceramic scintillator materials deemed suitable for the present x-ray conversion medium is disclosed in U.S. Pat. No. 4,525,628, also assigned to the present assignee, as exhibiting superior conversion efficiency compatible with modern computerized tomography or other digital imaging requirements. Said general class of ceramic scintillator materials comprises rare earth oxides doped with rare earth activators which yield a cubic crystal structure of high density and optical transmittance with the preferred rare earth oxides being selected from the group consisting of $Gd_2O_3$, $Y_2O_3$, $La_2O_3$, and $Lu_2O_3$ and wherein the rare earth activator ion is selected from the group consisting of europium, neodymium, ytterbium and dysprosium. Representative ceramics further specified in said general class of superior solid state scintillator materials include $Gd_2O_3$ activated with europium ion and $Gd_2O_3$ combined with $Y_2O_3$ which is also activated with europium ion. An entirely dissimilar class of solid state monocrystalline scintillator materials is also disclosed in said aforementioned reference which can be used as the present x-ray conversion medium despite higher costs and difficulties of preparation as well as somewhat inferior performance characteristics. Said lesser preferred single crystals are grown from a melt and include $NaI:Tl$, $CaF_2:Eu$, $Bi_4Ge_3O_2$, $CsI:Tl$ and $CdWO_4$.

A more limited class of the above defined polycrystalline ceramic scintillator materials which is preferred for the present x-ray conversion medium is disclosed in U.S. Pat. No. 4,473,513, also assigned to the present assignee. More particularly, said scintillator body comprises a sintered polycrystalline yttria ($Y_2O_3$)-gadolinia ($Gd_2O_3$) ceramic exhibiting high density, optical clarity, uniformity and a cubic crystalline structure which further includes one or more oxides of the rare earth elements selected from europium, neodymium, ytterbium, dysprosium, terbium, and praseodymium as activators along with oxides of other metal ions selected from zirconium, thorium, and tantalum to serve as transparency-promoting densifying agents. A typical ceramic of said type comprises about 5 to 50 mole percent $Gd_2O_3$, between about 0.02 and 12 mole percent of at least one rare earth activator oxide selected from the group consisting of $Eu_2O_3$, $Nd_2O_3$, $Yb_2O_3$, $Dy_2O_3$, $Tb_2O_3$ and $Pr_2O_3$, the remainder being $Y_2O_3$. Both of said above identified commonly assigned patents are further specifically incorporated by reference into the present application to avoid further necessity for added description herein of a suitable medium in which to achieve said conversion of the impinging X radiation to an optical image having enhanced visual characteristics.

A different preferred class of scintillator materials deemed suitable for the present x-ray conversion medium is disclosed in the above enumerated co-pending applications. Accordingly, said scintillator body may comprise a composite of x-ray stimulable phosphor crystals suspended in a matrix of a solid synthetic organic polymer having an optical refractive index closely matching the optical refractive index of said phosphor crystals while also being substantially transparent to the optical radiation being emitted by said phosphor crystals. A representative x-ray converter medium of said type is barium fluorochloride activated with europium ion while said synthetic organic polymer is a polysulfone. In said typical medium, the phosphor crystals occupy a minimum weight fraction of at least 50% whereas the polysulfone polymer is a homopolymer. A different x-ray converter medium of this same type utilizes phosphor crystals of europium activated barium fluorohalide further containing a sufficient level of an impurity ion selected from Group 1A and 3A elements in the periodic table of elements to reduce the optical refractive index of said phosphor. In said latter medium, the europium activator level is preferably maintained in the range from 0.1–2.0 weight percent based on the weight of said phosphor whereas the impurity ion level is preferably maintained in the approximate range from 0.3–3.0 weight percent based on the weight of said phosphor. Said phosphor modification can be achieved as further described in said aforementioned co-pending applications, both of which are also specifically incorporated by reference into the present application, by simply combining a halide compound of the impurity element with the already formed phosphor material.

As well be illustrated below in greater detail for the hereinafter described preferred embodiments, the digital recording of an optical image having enhanced visual characteristics further requires that the photodetection means operatively associated with the present scintillator medium co-operate in a particular manner. As previously indicated, it is essential that said co-operating photodetection means be positioned physically contiguous to said scintillator body so that substantially all optical radiation emerging from the latter medium be detected and which can possibly be most easily achieved when the individual members are joined in direct physical abutment. As also previously indicated, the pixel arrangement in said photodetection means is required to be unbroken so that all of the impinging optical radiation will be collected and which can also possibly be achieved with a staggered column orientation of the individual detector arrays. For digitally recording an optical image having enhanced visual quality in accordance with the present improvement, it becomes still further required that said photodetection means be operated so that the optical radiation being received is processed in a controlled manner. More particularly, the charge transfer taking place in the electrically interconnected devices being employed in the present photodetection means is required to be at the same rate as the movement rate for said moving photodetection means albeit in the opposite travel direction in order to provide proper signal integration for each fixed frame pixel being viewed in the stationery object being irradiated during the time scan for said viewing process. Said proper signal integration is carried out in the present photodetection means by controlling the synchronized signal shifting so that signals are shifted between adjoining interconnected charge transfer devices at the same velocity as the scan movement albeit in the opposite travel direction. Accordingly, the synchronized signal shifting between interconnected charge transfer devices proceeds serially throughout each column of devices in the photodetection means being employed and with the output signals from each column being further collected in the digital processing means of the present radiographic imaging and recording system.

DETAILED DESCRIPTION OF THE PREFERRED EMBODIMENTS

Figure 1:
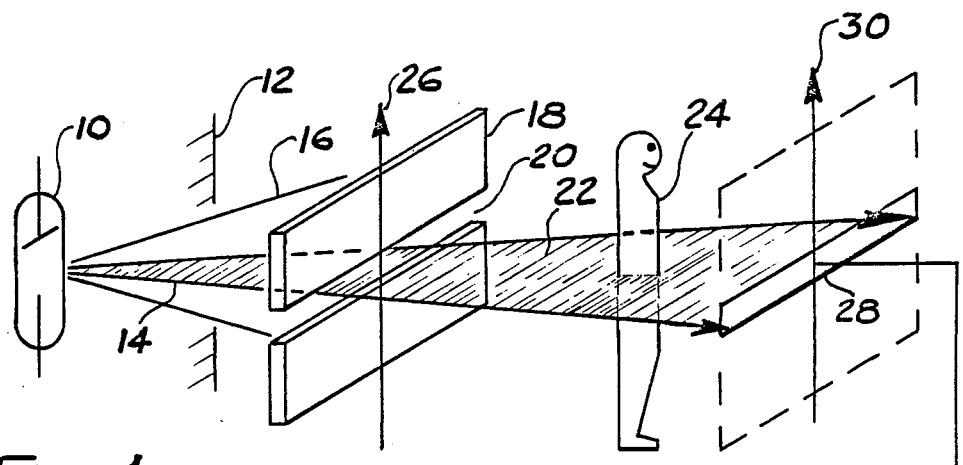
FIG. 1 is a schematic representation partially in block diagram form for a typical digital radiographic imaging and recording system according to the present invention.

Referring to the drawings, FIG. 1 depicts partially in block diagram form a typical equipment means employed to form and record a digital radiographic image in accordance with the present invention. A source of X radiation, such as a conventional x-ray tube 10 is shown which is operated in the conventional manner with a fixed coarse aperture member 12 to provide a horizontal x-ray beam of suitable size 14 corresponding in area size to the overall object being scanned for exposure of said selected object, such as for a medical patient. The emerging x-ray fan beam is further modulated with a movable scanning member 18 having a slot opening 20 to provide a moving x-ray fan beam 22 for irradiation of said medical patient 24 in accordance with the present radiographic imaging process. As can be noted from said drawing, the linear travel direction 26 for said moving x-ray fan beam proceeds upwardly although it is contemplated that an opposite travel direction can be employed, if desired, for a second slice image and with eventual return of said scanning member to its original starting location. Said movable scanning member 18 is synchronously operated with a composite x-ray conversion and photodetection member 28 shown to be travelin the same linear travel direction 30. As is more fully explained in connection with FIG. 2 description for said composite x-ray conversion and photodetection member 28, the X radiation in the moving fan beam aligned therewith is thereafter processed synchronously in a particular manner by said means after passage through the selected stationery object. The output signals from said photodetection means employed in the present radiographic system provide an electronic reproduction of an optical image formed upon conversion of said impinging X radiation for further processing with high speed electronic computer means 32 operatively incorporated in the present radiographic system. Said digital computer or processor means 32 includes an image processing algorithm developed for said purpose to produce a digitized representation of the presently enhanced optical image. As previously indicated, said digital processing means 32 in the present radiographic system can also include additional signal processing means to further enhance the quality of said converted optical image. Said digitized optical image is finally recorded by known electronic recording means 34 such as a magnetic tape and which as further previously indicated can be further contemporaneously viewed as a reconverted visual image by other known electronic display means (not shown) operatively associated with said recording means.

The present method of recording a digital radiographic image thereby comprises forming an optical image by scanning an object with a moving scintillator body in a linear travel direction during exposure of said object to a moving x-ray fan beam to form said optical image as a point-by-point and line-by-line composite of the entire object area being scanned, simultaneously transmitting said optical image when formed to a moving photodetector member aligned with said moving x-ray fan beam and moving synchronously in the same linear travel direction as said moving x-ray fan beam, converting said optical image with said moving photodetector member to an electrical analog representation thereof and without experiencing substantial optical attenuation, and immediately converting said electrical analog representation of said optical image to a recorded digital representation thereof having improved visual characteristics by digital processing means. For the purpose of better achieving said objective it is essential that a co-operative physical relationship be maintained in said composite x-ray conversion and photodetector member 28 so that all of the optical radiation being generated in said medium will be detected. Accordingly, not only is there a requirement for said x-ray conversion medium to be physically positioned adjacent to said photodetection means and preferably in direct physical abutment therewith but also that the physical geometry or configuration of the detection elements along with proper operation of said detection elements in said photodetection means enable capture of all impinging optical radiation. By said latter means it now becomes possible to provide an unbroken or complete digital representation for all optical radiation generated in accordance with the present radiographic imaging process.

Figure 2:
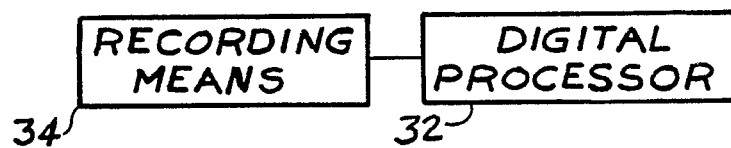
FIG. 2 is an exploded view depicting the scanning type composite x-ray conversion and photodetection member being employed in the present radiographic imaging and recording system.
Figure 2:
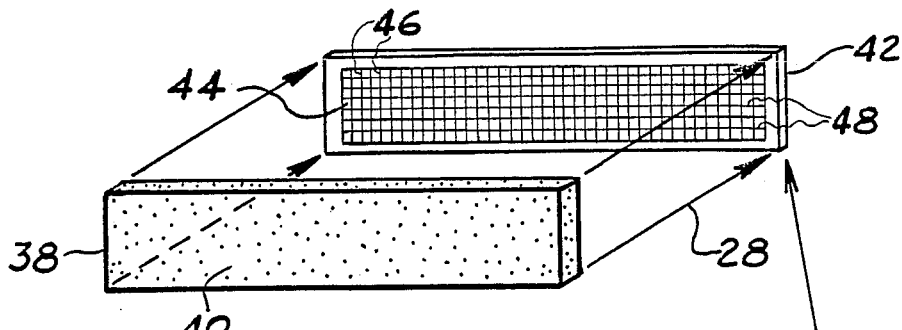

FIG. 2 is an exploded representation depicting the individual subcomponents or parts of the composite x-ray conversion and photodetection member 28 suitable for use in the above described digital radiographic imaging and recording system. More particularly, a bar-shaped movable scintillator body 38 is depicted as spaced apart from a contemporaneously movable bi-directional charge transfer array 42 to form said composite member 28 when joined together in a physically contiguous relationship. Such a physical configuration for the composite member permits a direct conversion of the x-rays impinging upon the scintillator body to be converted to an optical image and be simultaneously converted to electrical signals representative of said optical image with higher quantum detection efficiency, resolution and contrast than would occur if intermediate transducing steps were introduced along with still other quantum losses and limitations inherent with the now employed image intensifier devices. Understandably, the still further compact, rugged and inexpensive nature of the present composite member represents still other desirable advantages being achieved. The drawing further depicts the physical orientation of charge transfer devices 44 forming the photodetection means of said composite member. Said charge transfer devices 44 are generally aligned to columns 46 and rows 48 for electrical interconnection and operation in a particular manner to be described more fully hereinafter. In such manner, said individual charge transfer devices 44 are preferably constructed in modular form whereby vertical and horizontal resolution elements (not shown) are employed in an already known manner to provide the pixel photosites for the electronic analog representation of the optical image being recorded. It becomes thereby possible in said already known manner to construct a typical photodetector array having said configuration with an overall bar width of 14" or greater to scan about 17" in a vertical direction, such as desired for medical chest examinations, and made up of 16 electrically paired modules physically staggered in horizontal rows of a co-operative time delay and integration mode of operation to be more fully explained below. Each of said typical modules can be known charge coupled devices in the form of semi-conductor chips having a representative 50 pixel column and 128 columns per chip to provide a total 6400 pixel representations in the converted electronic image per chip. Accordingly, when said representative photodetector array is operated in the time delay and integration mode hereinafter explained, there will be achieved a total pixel number of approximately $5 \times 10^6$ pixels being represented in the overall image that is recorded according to the present invention. It can be further appreciated from said illustrated method of radiographic imaging according to the present invention that a 50 fold integration of signal takes place for each fixed frame of the body pixel being viewed.

Figure 3:
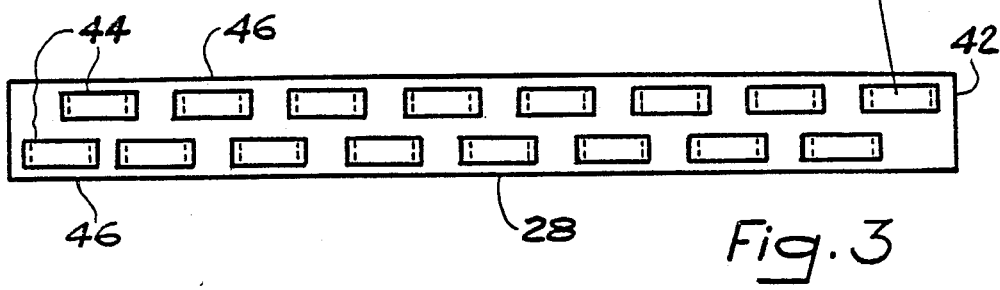
FIG. 3 is a side elevation view depicting a preferred physical orientation for the charge transfer devices being employed as the photodetection means in the present radiographic imaging and recording system.

FIG. 3 is a side elevation view depicting the above type representative photodetector member 42. The illustrative charge coupled devices 44 in said detector member 42 are thereby physically oriented in staggered vertical columns 46 with a parallel vertical alignment being found between adjoining columns. Said charge transfer modules 44 are further physically oriented in rows transverse to said parallel columns with a co-operative spatial orientation of the individual charge transfer modules in said rows such that the individual charge transfer modules forming a row are aligned in an offset but overlapping positional relationship with respect to the next adjoining rows of said individual charge transfer modules. By overlapping the detection devices in said manner there can be achieved an unbroken pixel representation for the object being viewed thereby capturing all of the x-ray details made available along with an improvement in the horizontal resolution of the recorded image being achieved. When said representative detector array 42 is operated as further explained below so that charge transfer takes place in the 50 pixel columns by downward movement while the composite detector member 28 proceeds upwardly in a linear travel direction and with said upward scan speed being controlled accurately with said downward charge transfer it becomes possible to scan the desired overall 17" scan distance during a typical 0.5 second scan time period at an overall body radiation exposure of 1 mR dosage or less.

The proper signal processing in the composite x-ray conversion and photodetection member 28 above described to achieve an enhanced image quality according to the present invention has already been generally recognized. More particularly, in the aforementioned U.S. Pat. No. 4,383,327, there is employed a photodetection array being operated in a time delay and integration mode of operation to provide a recorded digital radiographic image and wherein the signal processing means therein employed is analogous to that which can be employed for proper operation of the present type composite x-ray converter and photodetection means. Accordingly, said prior art method of recording a digital radiographic image employs a charge coupled device array having as an integral part thereof signal processing capabilities whereby the signals generated by each of the detectors are stored in respective storage elements. These stored signals, at controlled time intervals, are all shifted by clocking signals to the storage elements of other adjacent detectors. Once the signals have been shifted, the signals are augmented by new signals, if any, generated by the respective detectors of the storage elements in which the signals are stored. After having been shifted through several storage elements, these augmented signals exit from the array to be further processed and conditioned so as to enable an image to be stored or reconverted into a visual image created through a suitable visual system. In connection with shifting and processing of radiation signals in the present radiographic imaging system, like synchronization is maintained between movement of the x-ray fan beam herein employed to form the initial optical image and the presently employed composite conversion and detector member 28 at a controlled speed and in a known pattern. This controlled speed is synchronized with the control time intervals at which signals are shifted from storage element to storage element. Specifically, the shifting pattern that is the sequence that the signals follow as they are shifted from storage element to storage element within the photodetection array, is designed to be generally similar to the movement pattern for the aforementioned moving components in the present radiographic system. As the x-ray fan beam moves, causing the radiation passing through the small area thereof to likewise move and fall upon an adjacent detector element, the pixel signal generated prior to the movement is shifted to the storage element associated with the detector receiving the radiation at the same velocity rate as the physical movement. In this manner, each pixel in the accumulated image results from an integration process. The signal processing being carried out in the present radiographic imaging and recording system by said time delay also typically features columns of the image sensing elements that are tied to a vertical column analog transport register. At the top of each vertical analog transport register is a horizontal analog transport register. An imaging sensing element generates an electrical signal as a function of the radiation sensed thereby and temporarily stores said signals. These stored signals are passed along to the column shift registers in a controlled manner when activated by a vertical clocking signal. In this way charges are accumulated in the vertical analog transport register for eventual transfer to the horizontal analog transport register when activated by a horizontal clocking signal. When the object being viewed is scanned along said charge coupled device matrix in the same direction as the columns and at the same rate as the charge is passed from line-to-line, a non-blurred image results with each pixel in the accumulated image being the result of the aforementioned described integration. In the further description of the preferred embodiments for said prior art radiographic imaging and recording system, there is further described the operation of a two phase charge coupled device shift register to carryout the desired signal processing. Accordingly, the analogous operation of said detector devices is presented herein as being exemplary also of proper operation for the improvement being carried out in accordance with the present invention.

In connection with such already known operation for said two phase charge coupled devices as described in FIG. 3 of U.S. Pat. No. 4,383,327, two complimentory clock voltage wave forms are respectively connected to alternate closely-spaced gate electrodes on a surface of a thin insulating layer provided on a piece of silcon metal. An upper layer of the silcon is n-doped. The substrate of the silcon layer is p-doped. The first clock signal is connected to alternately spaced gate electrodes and similarly the second clock voltage is connected to separately spaced apart gate electrodes. As a result of said electrical interconnection, voltage potential wells are created by the clock voltage wave forms. That is, a deep potential well which attracts electrons is created under an electrode where the clock voltage is high and disappears under an electrode where the clock voltage is low. In said manner a finite charge of electrons or other charge bundles such as "holes" are shifted along said two phase charge coupled device register as controlled by the two clock signals being employed. Further electrical interconnection between said two phase charge coupled shift-register as controlled by the aforementioned clock signals and the imaging sensing elements being employed in said photodetection means enables the desired time delay and integration mode of operation to take place. Charge coupled two-dimensional image arrays of said type are commercially available. For example, Fairchild Semi-Conductor, Inc. manufactures a 380×488 image array suitable for carrying out the practice of the present invention. The model number for such array is #CD221CDC with the operation of such an array being fully detailed and understood by those skilled in the electronic art through the specification sheets that accompany these devices.

The above described operation for the present digital radiographic imaging system produces the digitized final image in a point-by-point and line-by-line manner. In typically doing so, the moving x-ray fan bean proceeds vertically upward through a horizontal line of pixels in the object being scanned with the emerging X radiation impinging upon a line of photosites located in the scintillator body portion of the moving composite x-ray conversion and photodetection member being employed. The point-by-point conversion of X radiation to optical photons by the scintillator material is thereupon directly transmitted to the individual detector elements located in the physically adjacent photodetection array. The electronic signal generated responsive to the optical radiation being sensed by said individual detector element is vertically shifted downward from a first row in said photodetection array to an adjacent row upon activation by a vertical clock signal. At the same time interval, the composite member continues vertical upward movement so that X radiation now falling upon the next line of photosites located in the scintillator body will be passing through the same line of pixels or photosites in the object being scanned that previously fell upon the last line of photosites. As said imaging process continues, the electronic signals being shifted vertically downward in said photodetection array each represent the accumulated signals corresponding to a single pixel emerging from the object being scanned. Thus, the individual pixels in the digitized image ultimately produced result from an integration mode of operation with said integration proceeding over the full length of columns in said photodetection array. After such integration, the accumulated signals are shifted horizontally to provide input signals to the further operatively associated digital processing means employed in the presently improved radiographic imaging system.

It will be apparent from the foregoing description that a broadly useful composite x-ray conversion and photodetection means has been discovered for digital radiography enabling enhanced quality for the optical image being formed and recorded. It will be apparent from said foregoing description, however, that various modifications in the specific embodiments above described can be made without departing from the spirit and scope of the present invention. For example, it is contemplated that the movable scanning member forming a movable x-ray fan beam in the present x-ray imaging system can be provided with a different shaped aperture to still further reduce the radiation dosage to which a medical patient is otherwise exposed. By limiting said aperture opening to just those physical locations being occupied by the co-operating aligned detector elements in said composite member, such as with properly located holes or slots, there can be achieved such objective. It is further contemplated that charge injection devices can be directly bonded to the scintillator body in said composite member and thereby serve as alternate photodetection means in the present radiographic imaging and recording system. Additionally, a substitution of still other phosphor, ceramic and polymeric materials other than specifically disclosed to form the scintillator body portion of said composite member is further deemed possible without experiencing substantial loss of the enhanced image quality. Moreover, still other physical configurations of the presently improved digital radiographic imaging and recording system than above specifically disclosed are possible so long as the essential dynamic relationships above disclosed are preserved between the moving x-ray exposure means and said moving composite member. It is intended to limit the present invention, therefore, only by the scope of the following claims:

What we claim as new and desire to secure by Letters Patent of the United States is:

1. A digital radiographic image recording system which comprises:
 (a) a movable scintillator body having a dense, self-supporting and substantially void-free single flat layer configuration which is substantially transparent to the optical radiation emitted by said medium, said scintillator body comprising a polycrystalline scintillator ceramic with a high X-ray absorption value and a material density of at least 99% so that substantially all X radiation impinging thereon will be converted therein to optical radiation without excessive scattering and loss of the converted optical radiation, (b) a stationary X-ray source to expose said scintillator body to an X-ray fan beam moving in a linear non-arcuate travel direction after passage through an object, (c) a photodetection member positioned physically contiguous with said moving scintillator body and movable therewith so that both scintillator body and photodetection member move synchronously together with the moving x-ray fan beam in the same linear non-arcuate travel direction for conversion of said moving fan beam to an optical image for simultaneous detection of said optical image in a point-by-point and line-by-line manner, (d) said movable photodetection member having a plurality of charge transfer devices arranged in electrically connected columns and rows, said columns being aligned in the same linear non-arcuate travel direction as the moving X-ray fan beam while said rows being aligned substantially transverse thereto in order to also synchronously shift the signals being generated by optical radiation impinging on the individual charge transfer device located in the same column in the opposite travel direction to the travel direction of said moving photodetection member and with said synchronous signal shifting being carried out by a time delay and integration mode of operation to form an electrical analog representation of said optical image without experiencing substantial optical attenuation, the pixel arrangement in said photo-detection member also being unbroken so that all impinging optical radiation will be collected, the synchronous signal shifting further being carried between adjoining charge transfer devices such that signals are shifted from a device having received optical radiation to the next adjoining device at the same velocity rate as the physical movement, and (e) digital processing means for immediately converting said electrical analog representation of said optical image to a recorded digital representation thereof with higher quantum detection efficiency, resolution and contrast.

2. A digital radiographic image recording system as in claim 1 wherein said time delay and integration mode of operation for said moving photodetector member is achieved with a spatial orientation of the individual charge transfer devices such that the individual charge transfer devices forming a row are aligned in an offset but overlapping positional relations with respect to the next adjoining row of individual charge transfer devices.

3. A digital radiographic image recording system as in claim 2 wherein a like spatial relationship is maintained between all alternate rows of individual charge transfer devices in said photodetection member to form a parallel alignment for the column orientation of said charge transfer devices in said photodetection member.

4. A digital radiographic image recording system as in claim 1 wherein the charge transfer devices are charge coupled devices.

5. A digital radiographic image recording system as in claim 1 wherein the synchronized signal shifting between adjoining charge transfer devices proceeds serially throughout each column of charge transfer devices in said photodetector member and with the output signals from each column being further stored in the digital processing means of said radiographic image recording system.

6. A digital radiographic image recording system as in claim 1 which further includes visual display of the digitized information.

7. A digital radiographic image recording system as in claim 6 wherein said visual display is operatively associated with said means for digital recording of the optical image.

8. A digital radiographic image recording system as in claim 1 wherein said scintillator body comprises a sintered polycrystalline rare earth doped rare earth oxide ceramic exhibiting high density, optical clarity, and a cubic crystalline structure.

9. A digital radiographic image recording system as in claim 8 wherein said rare earth oxide is selected from the group consisting of $Gd_2O_3$, $Y_2O_3$, $La_2O_3$ and $Lu_2O_3$.

10. A digital radiographic image recording system as in claim 9 wherein said rare earth dopant ion is selected from europium, neodymium, ytterbium and dysprosium.

11. A digital radiographic image recording system as in claim 8 wherein said ceramic comprises between about 5 and 50 mole percent $Gd_2O_3$, between about 0.02 to about 12 mole percent of at least one rare earth activator oxide selected from the group consisting of $Eu_2O_3$, $Nd_2O_3$, $Yb_2O_3$, $Dy_2O_3$, $Tb_2O_3$, and $Pr_2O_3$, the remainder being $Y_2O_3$.

12. A digital radiographic image recording system as in claim 1 wherein said scintillator body comprises a composite of x-ray stimulable phosphor crystals suspended in a matrix of a solid synthetic organic polymer having an optical refractive index closely matching the optical refractive index of said phosphor crystals while also being substantially transparent to the optical radiation being emitted by said phosphor crystals.

13. A digital radiographic image recording system as in claim 12 wherein said phosphor is barium fluorochloride activated with europium ion and said synthetic organic polymer is a polysulfone.

14. A digital radiographic image recording system as in claim 12 wherein the phosphor crystals occupy a minimum weight fraction in said member of at least 50%.

15. A digital radiographic image recording system as in claim 12 wherein the polysulfone polymer is a homopolymer.

16. A digital radiographic image recording system as in claim 12 wherein said phosphor crystals comprise a europium activated barium fluorohalide further containing a sufficient level of an impurity ion selected from Group 1A and 3A elements in the periodic table of elements to reduce the optical refractive index of said phosphor.

17. A digital radiographic image recording system as in claim 16 wherein said impurity ion is incorporated as a halide compound of the impurity element.

18. A digital radiographic image recording system as in claim 16 wherein the europium activator level is in the approximate range from 0.1–2.0 weight percent based on the weight of said phosphor.

19. A digital radiographic image recording system as in claim 16 wherein the level of impurity ion is in the approximate range from 0.3–3.0 weight percent based on the weight of said phosphor.

20. A digital radiographic image recording system as in claim 16 wherein the phosphor is europium activated barium fluorochloride.

21. A method to record a digital radiographic image which comprises:
(a) forming an optical image by scanning an object exposed to a stationary X-ray source with a moving scintillator body in a linear non-arcuate travel direction during exposure of said object to a moving X-ray fan beam to form said optical image as a point-by-point and line-by-line composite of the subject being scanned,
(b) said scintillator body having a dense, self-supporting and substantially void-free single flat layer configuration which is substantially transparent to the optical radiation emitted from said medium, said scintillator body comprising a polycrystalline scintillator ceramic with a high X-ray absorption value and a material density of at least 99% so that substantially all X radiation impinging thereon will be converted therein to optical radiation without excessive scattering and loss of the converted optical radiation,
(c) simultaneously transmitting said optical image when formed to a moving photodetection member aligned with said moving x-ray fan beam and moving synchronously in the same linear non-arcuate travel direction as said moving x-ray fan beam,
(d) said moving photodetection member being positioned physically contiguous with said moving scintillator body and movable therewith so that both scintillator body and photodetection member move synchronously with the moving x-ray fan beam in the same linear non-arcuate travel direction for conversion of said moving X-ray fan beam to an optical image for simultaneous detection of said optical image as an electrical analog representation thereof and without experiencing substantial optical attenuation,
(e) said moving photodetection member also having a plurality of charge transfer devices arranged in electrically connected columns and rows, said columns being aligned in the same linear non-arcuate travel direction as the moving x-ray fan beam while said rows being aligned substantially transverse thereto in order to also synchronously shift the signals being generated by optical radiation impinging on an individual charge transfer device located in the same column in the opposite direction to the travel direction of said moving photodetection member and with said synchronous signal shifting being carried out by a time delay and integration mode of operation, the pixel arrangement in said photodetection member also being unbroken so that all impinging optical radiation will be collected, the synchronous signal shifting further being carried out between adjoining charge transfer devices such that signals are shifted from a device having received optical radiation to the next adjoining device at the same velocity as the physical movement, and
(f) immediately converting said electrical analog representation of said optical image to a recorded digital representation thereof with digital processing means at higher medium detection efficiency, resolution and contrast.

22. A method as in claim 21 wherein said time delay and integration mode of operation for said moving photodetection member is achieved with a spatial orientation of the individual charge transfer devices such that the individual charge transfer devices forming a row are aligned in an offset but overlapping positional relationship with respect to the next adjoining row of individual charge transfer devices.

23. A method as in claim 21 wherein a like spatial relationship is maintained between all alternate rows of individual charge transfer devices in said photodetection member to form a parallel alignment for the column orientation of said charge transfer devices in said member.

24. A method as in claim 21 wherein the synchronized signal shifting between adjoining charge transfer devices proceeds such that signals are shifted from a device having received optical radiation to the next adjoining device after the latter device has received optical radiation.

25. A method as in claim 21 wherein the synchronized signal shifting between adjoining charge transfer devices, proceeds serially through each column of charge transfer devices in said composite member and with the output signals from each column being further stored by the digital processing means.

26. A method as in claim 21 wherein the signal shifting is carried out with charge coupled devices.

27. A method as in claim 21 which further includes digital imaging of the optical image.

28. A digital radiographic image recording system which comprises:
(a) a movable scintillator body having a dense, self-supporting and substantially void-free single flat layer configuration which is substantially transparent to the optical radiation emitted by said medium, said scintillator body comprising a polycrystalline scintillator ceramic with a high x-ray absorption value and a material density of at least 99% so that substantially all X radiation impinging thereon will be converted therein to optical radiation without excessive scattering and loss of the converted optical radiation,
(b) a stationary X-ray source to expose said scintillator body to an X-ray fan beam moving in a linear non-arcuate travel direction and after passage through an object,
(c) a photodetection member positioned in direct physical contact with said movable scintillator body and moving therewith so that both scintillator body and photodetection member move synchronously with the moving x-ray fan beam in the same linear non-arcuate travel direction for conversion of said moving X-ray fan beam to an optical image for simultaneous detection of said optical image in a point-by-point and line-by-line manner without experiencing substantial optical attenuation,
(d) said movable photodetection member having a plurality of charge transfer devices arranged in electrically connected columns and rows, said columns being aligned in the same linear non-arcuate travel direction as the moving x-ray fan beam while said rows being aligned substantially transverse thereto in order to synchronously shift the signals being generated by optical radiation impinging on the individual charge transfer devices located in the same column in the opposite direction to the travel direction of said movable photodetection member and with said synchronous signal shifting being carried out by a time delay and integration mode of operation to form an electrical analog representation of said optical image, the pixel arrangement in said photodetection member also being unbroken so that all impinging optical radiation will be collected, the synchronous signal shifting further being carried out between adjoining charge transfer devices such that signals are shifted from a device having received optical radiation to the next adjoining device at the same velocity rate as the physical movement, and (e) digital processing means for immediately converting said electrical analog representation of said optical image to a recorded digital representation thereof with higher quantum detection efficiency, resolution and contrast.

29. A method to record a digital radiographic image which comprises:

(a) forming an optical image by scanning an object exposed to a stationary X-ray source with a moving scintillator body in a linear non-arcuate travel direction during exposure of said object to a moving X-ray fan beam to form said optical image as a point-by-point and line-by-line conversion of the subject being scanned, (b) said scintillator body having a dense, self-supporting and substantially void-free single flat layer configuration which is substantially transparent to the optical radiation being emitted from said medium, such scintillator body comprising a polycrystalline scintillator ceramic with a high x-ray absorption value and a material density of at least 99% so that substantially all X radiation impinging thereon will be converted therein to optical scintillator without excessive scattering and loss of the converted optical radiation, (c) simultaneously transmitting said optical image when formed to a moving photodetection member aligned with said moving x-ray fan beam and moving in the same linear non-arcuate travel direction as said moving x-ray fan beam, (d) said moving photodetection member being positioned in direct physical contact with said moving scintillator body and movable therewith so that both scintillator body and photodetection member move synchronously with the moving x-ray fan beam in the same linear non-arcuate travel direction for conversion of said moving x-ray fan bean to an optical image for simultaneous detection of said optical image as an electrical analog representation thereof and without experiencing substantial optical attenuation, (e) said moving photodetection member also having a plurality of charge transfer devices arranged in electrically connected columns and rows, said columns being aligned in the same linear non-arcuate travel direction as the moving x-ray fan beam while said rows being aligned substantially transverse thereto in order to also synchronously shift the signals being generated by the optical radiation impinging on an individual charge transfer device located in the same column in the opposite direction to the travel direction of said moving photodetection member and with said synchronous signal shifting being carried out in a time delay and integration mode of operation, the pixel arrangement in said photodetection member also being unbroken so that all impinging optical radiation will be collected, the synchronous signal shifting further being carried out between adjoining charge transfer devices such that signals are shifted from a device having received optical radiation to the next adjoining device at the same velocity rate as the physical movement, and (f) immediately converting said electrical analog representation of said optical image to a recorded digital representation thereof with digital processing means at higher quantum detection efficiency, resolution and contrast.

* * * * *

UNITED STATES PATENT AND TRADEMARK OFFICE
CERTIFICATE OF CORRECTION

PATENT NO.  : 4,873,708

DATED       : October 10, 1989

INVENTOR(S) : Dominic A. Cusano, et. al.

It is certified that error appears in the above-identified patent and that said Letters Patent is hereby corrected as shown below:

Column 17, line 46, change "scintillator" to
-- radiation --.

Signed and Sealed this

First Day of September, 1992

Attest:

DOUGLAS B. COMER

*Attesting Officer*    Acting Commissioner of Patents and Trademarks